US008619322B2

United States Patent
Nagai

(10) Patent No.: US 8,619,322 B2
(45) Date of Patent: Dec. 31, 2013

(54) IMAGE FORMATION APPARATUS AND IMAGE FORMATION METHOD FOR PERFORMING COLOR DEVIATION CORRECTION

(75) Inventor: Jun Nagai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 12/905,506

(22) Filed: Oct. 15, 2010

(65) Prior Publication Data

US 2011/0116114 A1  May 19, 2011

(30) Foreign Application Priority Data

Nov. 13, 2009  (JP) .................................. 2009-260318

(51) Int. Cl.
G06F 15/00 (2006.01)
G06K 1/00 (2006.01)

(52) U.S. Cl.
USPC ............................................. 358/1.9; 358/2.1

(58) Field of Classification Search
USPC ............................................. 358/1.9, 2.1, 518
See application file for complete search history.

(56) References Cited

U.S. PATENT DOCUMENTS

| 7,903,304 B2 * | 3/2011 | Sakamoto ...................... 358/518 |
| 8,335,026 B2 | 12/2012 | Muramatsu |
| 2004/0252345 A1 * | 12/2004 | Uekusa et al. ................. 358/2.1 |
| 2009/0086227 A1 * | 4/2009 | Nagai ............................ 358/1.9 |
| 2010/0231936 A1 | 9/2010 | Nagai |

FOREIGN PATENT DOCUMENTS

| JP | 08-207355 | 8/1996 |
| JP | 2002-116394 | 4/2002 |
| JP | 2003-241131 | 8/2003 |
| JP | 2004-170155 | 6/2004 |
| JP | 2007-144740 | 6/2007 |
| JP | 2009-251313 | 10/2009 |

\* cited by examiner

*Primary Examiner* — Twyler Haskins
*Assistant Examiner* — Michael Burleson
(74) *Attorney, Agent, or Firm* — Fitzpatrick, Cella, Harper & Scinto

(57) ABSTRACT

A problem in conventional electrical color deviation correction is that an awkward step is generated at a border where a pixel is offset by one-pixel-basis correction. Although such a step can be cancelled by less-than-one-pixel-basis correction, this smoothing process in turn generates unevenness in density. To solve these problems, in electrical color deviation correction, a draw command is analyzed to specify a draw position for color deviation correction for each of draw objects. Then, the object is drawn at the specified draw position, and an offset for color deviation correction is performed on an object basis.

9 Claims, 15 Drawing Sheets

| | REGION | WIDTH (mm) | INCLINATION |
|---|---|---|---|
| C | REGION 1 | L1 | m1/L1 |
| | REGION 2 | L2 | (m2 − m1)/L2 |
| | REGION 3 | L3 | (m3 − m2)/L3 |
| | REGION | WIDTH (mm) | INCLINATION |
| M | REGION 1 | ... | ... |
| | REGION 2 | ... | ... |
| | REGION 3 | ... | ... |
| | REGION | WIDTH (mm) | INCLINATION |
| Y | REGION 1 | ... | ... |
| | REGION 2 | ... | ... |
| | REGION 3 | ... | ... |
| | REGION | WIDTH (mm) | INCLINATION |
| K | REGION 1 | ... | ... |
| | REGION 2 | ... | ... |
| | REGION 3 | ... | ... |

FIG.6

IMAGE FORMATION APPARATUS AND IMAGE FORMATION METHOD FOR PERFORMING COLOR DEVIATION CORRECTION

BACKGROUND OF THE INVENTION

1. Field of the Invention

The present invention relates to an image processing technique, and particularly to color deviation correction in a sequential transfer of images of multiple colors formed by developing units provided for the respective multiple colors.

2. Description of the Related Art

To achieve high speed image formation, many recent electrophotographic color image formation apparatuses include the same number of developing devices and photoconductors as the number of color materials and employ a system in which images of different colors are sequentially transferred to an image transport belt and then to a recording medium.

Using such a system (i.e., a tandem system) can drastically reduce throughput time, but on the other hand generates problems attributable to factors such as nonuniformity and poor attachment position accuracy of lenses of a deflection scanner and poor attachment position accuracy of the deflection scanner itself to a main body of the image formation apparatus. More specifically, when a scan line inclines or curves and when each color has a different degree of the inclination or curvature, a color deviation occurs due to a positional deviation of each of the colors on a transfer sheet. This problem consequently makes it difficult to obtain a high-quality color image.

As a countermeasure against such a color deviation, Japanese Patent Laid-Open No. 2002-116394 (referred to as Patent Document 1 below), for example, describes a method in which the magnitude of a curvature of a scan line is measured using an optical sensor in an assembly step of a deflection scanner, and the deflection scanner is fixed after the curvature of the scan line is adjusted by mechanically rotating a lens.

Japanese Patent Laid-Open No. 2003-241131 (referred to as Patent Document 2 below) describes a method in which the magnitude of an inclination of a scan line is measured using an optical sensor in a step of attaching a deflection scanner to a main body of an image formation apparatus, and the deflection scanner is attached to the main body of the apparatus while mechanically inclining the deflection scanner to adjust the inclination of the scan line.

To correct a light path of an optical system, a correction optical system including a light source and an f-θ lens, a mirror on the light path, or the like needs to be mechanically moved to make the registration of a test toner image. For this reason, the methods described in Patent Documents 1 and 2 require a highly-accurate, movable member, which entails an increase in costs.

Further, since it takes time to complete the correction of the light path of an optical system, it is impossible to carry out the correction frequently. However, the deviation of the light path changes under the influence of a factor such as an increase in the machine temperature. Even if the correction is performed at a certain point, the influence of the increase in the machine temperature cannot be eliminated. Accordingly, it is difficult to prevent a color deviation by correcting the light path of the optical system.

Meanwhile, Japanese Patent Laid-Open No. 2004-170755 (referred to as Patent Document 3 below) describes a method in which an inclination and a curvature of a scan line is measured using an optical sensor, bitmap image data is corrected so that the inclination and the curvature may be canceled, and an image is formed based on the data thus corrected. This method employs electrical correction which involves processing of image data, and therefore requires neither a mechanical adjustment member nor an adjustment step at the time of assembly. In this respect, the method according to Patent Document 3 can deal with a color deviation less expensively than those according to Patent Documents 1 and 2.

Such electrical color deviation correction is divided into one-pixel-basis correction and less-than-one-pixel-basis correction. The one-pixel-basis correction offsets a pixel in a sub scanning direction on a pixel unit according to a correction amount of an inclination and a curvature. The less-than-one-pixel-basis correction, on the other hand, corrects the gradation value of preceding and succeeding pixels in the sub scanning direction. This less-than-one-pixel-basis correction can achieve cancellation of an awkward step generated at a border where a pixel is offset by the one-pixel-basis correction, and thus can achieve smoothing out of the image.

One of negative effects of the electrical color deviation correction is unevenness in density in a minute image due to the less-than-one-pixel-basis correction.

FIG. 1 is a diagram illustrating such unevenness in density in a minute image. An input image 101 in FIG. 1 is a fine line having a constant gradation value. An image 102 is formed by actually performing color deviation correction on the input image 101. Even though the input image 101 is an image with a constant image gradation value, the output image formed based on the image 102 after the color deviation correction is an image of a fine line with uneven density. This is because an electrophotographic image formation apparatus is generally poor at forming an isolated image while keeping the proportional relation between the image gradation value and the actual image density value. This influence appears noticeably as unevenness in density in a minute image formed of fine lines. Reference numeral 103 shows how toner density is uneven when the image 102 after the color deviation correction is actually formed.

One of countermeasures against the unevenness in density in a minute image is to avoid performing the less-than-one-pixel-basis correction on the minute image. Specifically, an image is binarized, and the binarized image is then compared with a smoothing determination pattern stored in advance. When the image matches the pattern, the less-than-one-pixel-basis correction is not performed, and when the image does not match the pattern, the less-than-one-pixel-basis correction is performed.

However, when the less-than-one-pixel-basis correction is not performed, an awkward step is generated at a border where a pixel is offset by the one-pixel-basis correction, as described above. Such a step generated by the offset is noticeable particularly in a text with a small point size, which is a minute image.

SUMMARY OF THE INVENTION

The present invention has been made in consideration of the above problems. The present invention provides an image formation apparatus which achieves electrical color deviation correction without generation of a step within a draw object and thus without unevenness in density. The image formation apparatus analyzes a draw command, specifies a draw position for color deviation correction for each of draw objects, and performs an offset for color deviation correction on a draw object basis.

An image formation apparatus of the present invention includes: a draw command analysis means that receives a draw command including a plurality of objects, and obtains position information indicating a draw position of each of the objects; a color deviation correction amount computation means that computes a color deviation correction amount of the object on the basis of a color deviation amount of each color used for image formation and of the position information on the object; a draw position correction means that corrects the draw position of the object by using the color deviation correction amount computed; and a rasterizing means that rasterizes the object to the draw position thus corrected.

The present invention achieves electrical color deviation correction without generation of a step within a draw object and thus without unevenness in density by performing an offset for color deviation correction on a draw object basis in the electrical color deviation correction.

Further features of the present invention will become apparent from the following description of exemplary embodiments (with reference to the attached drawings).

BRIEF DESCRIPTION OF THE DRAWINGS

FIG. 6 is a diagram showing an example of profile information;

DESCRIPTION OF THE EMBODIMENTS

Best modes for carrying out the present invention are described below using the drawings.

A case described herein as embodiments of the present invention is where the present invention is applied to a color laser printer using CMYK as its color materials. Note, however, that the purport of the present invention is not limited to such a case. Without departing from the gist of the present invention, the present invention is applicable to any electrophotographic image formation apparatus using toner, such as a color digital electrophotographic copier or a color facsimile machine.

Embodiment 1

An embodiment of the present invention is described based on the drawings.

Figure 1:
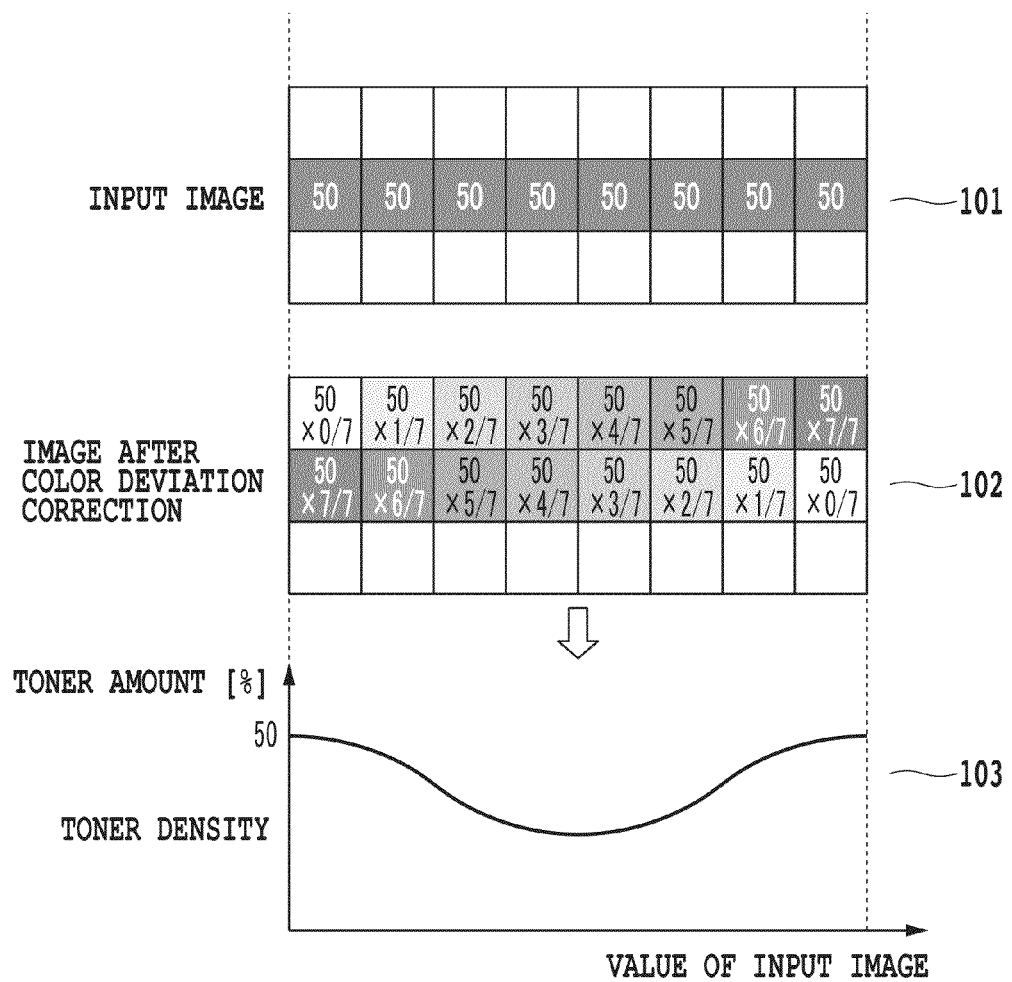
FIG. 1 is a diagram illustrating unevenness in density in a minute image.
Figure 2:
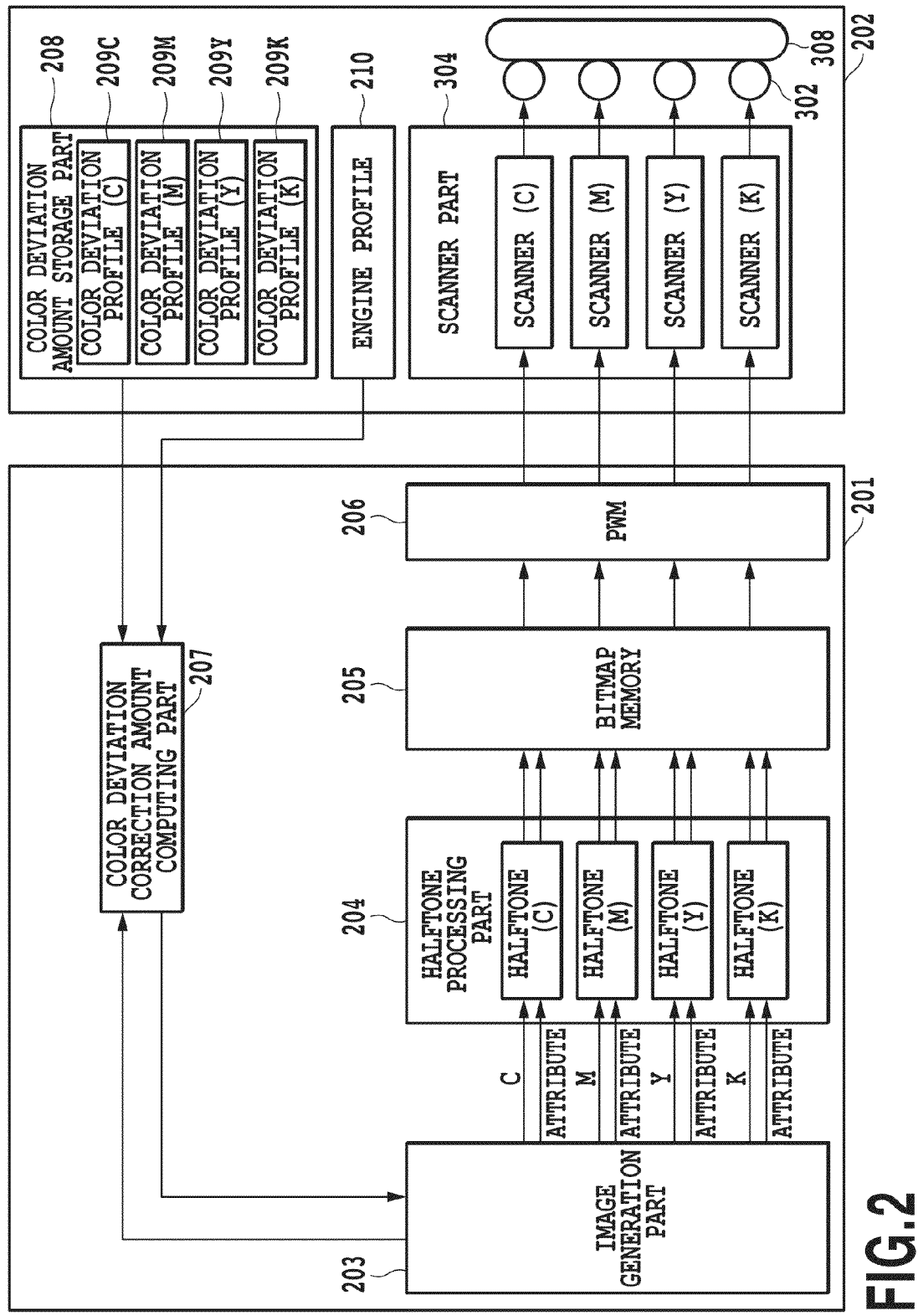
FIG. 2 is a block diagram illustrating the configuration of an image formation apparatus according to a first embodiment of the present invention.

FIG. 2 is a block diagram illustrating the configuration of an image formation apparatus according to Embodiment 1 of the present invention, the configuration being related to electrostatic latent image formation. The image formation apparatus includes an image processing unit 201 and an image forming unit 202. To give an overall process, the image processing unit 201 generates bitmap image data and performs halftone processing on the bitmap image data, and the image forming unit 202 forms an image on a recording medium based on the data from the image processing unit 201. Constituents in FIG. 2 will be described later.

Figure 3:
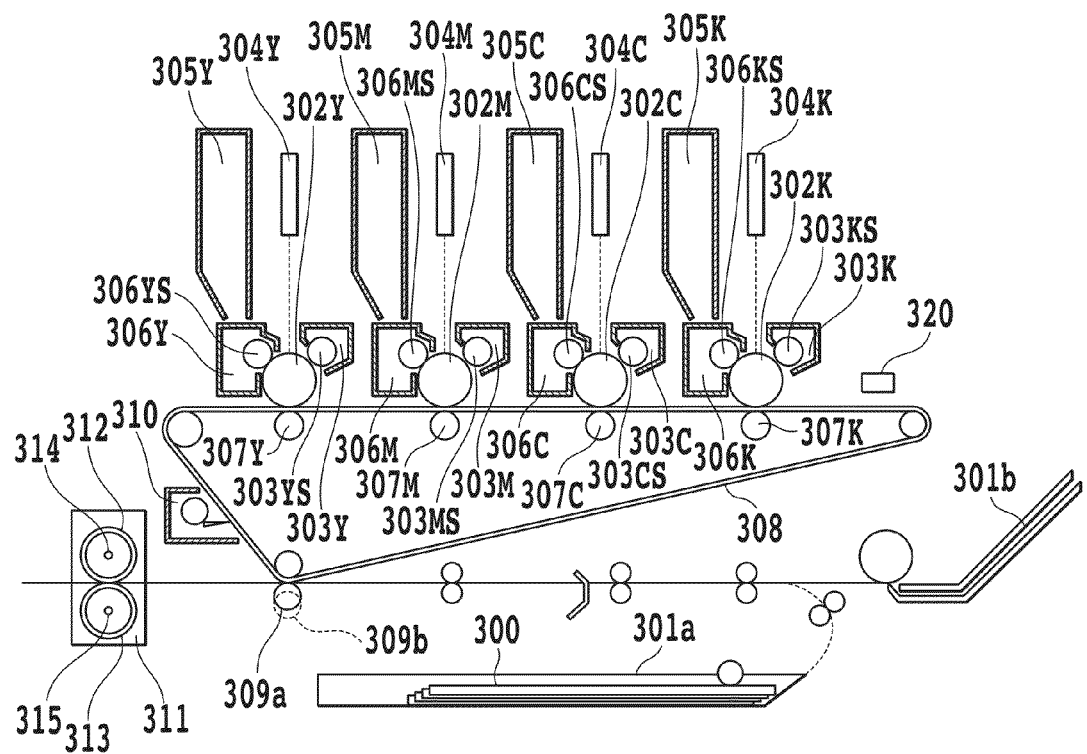
FIG. 3 is a cross-sectional view of a tandem color image formation apparatus.

FIG. 3 is a cross-sectional view of a tandem color image formation apparatus using an intermediate transfer body 308, as an example of an electrophotographic color image formation apparatus. Using FIG. 3, a description is given of operation of the image forming unit 202 of the electrophotographic color image formation apparatus. The image forming unit 202 forms an electrostatic latent image by driving an exposure light according to an exposure time outputted from the image processing unit 201, and forms a monochrome toner image by developing the electrostatic latent image. The image forming unit 202 then superimposes the monochrome toner image with other monochrome toner images to form a multi-color toner image. Then, the image forming unit 202 transfers the multi-color toner image onto a recording medium 300, and fixes the multi-color toner image onto the recoding medium.

A charging unit includes four injection charging devices 303Y, 303M, 303C, and 303K for yellow (Y), magenta (M), cyan (C), and black (K) stations, respectively. The injection charging devices 303Y, 303M, 303C, and 303K charge photoconductors 302Y, 302M, 302C, and 302K and are provided with sleeves 303YS, 303MS, 303CS, and 303KS, respectively.

Each of the photoconductors 302Y, 302M, 302C, and 302K is formed by coating an outer circumference of an aluminum cylinder with an organic photoconductive layer, and is rotatable upon receipt of a drive force from a drive motor (not shown). The drive motor can rotate the photoconductor 302Y, 302M, 302C, or 302K counterclockwise according to image formation operation.

An exposure unit is configured to form an electrostatic latent image by irradiating the photoconductor 302Y, 302M, 302C, or 302K with exposure light from a scanner part 304Y, 304M, 304C, or 304K to selectively expose the surface of the photoconductor to light.

A development unit is configured including four development devices 306Y, 306M, 306C, and 306K for the respective stations. The development devices 306Y, 306M, 306C, and 306K perform development of yellow (Y), magenta (M), cyan (C), and black (K), respectively, to visualize the electrostatic latent images. The development devices are provided with sleeves 306YS, 306MS, 306CS, and 306KS, respectively. Note that the development devices 306Y, 306M, 306C, and 306K are each attachable and detachable.

A transfer unit rotates the intermediate transfer body 308 clockwise to transfer a monochrome toner image from each photoconductor 302 onto the intermediate transfer body 308. Then, the monochrome toner images are transferred by the rotation of the photoconductors 302Y, 302M, 302C, and 302K and primary transfer rollers 307Y, 307M, 307C, and 307K located facing the respective photoconductors.

Applying an appropriate bias voltage to the primary transfer rollers 307 and making a difference in rotation speed between the photoconductors 302 and the intermediate transfer body 308 allow the monochrome toner images to be efficiently transferred onto the intermediate transfer body 308 (this is called primary transfer.).

Further, the transfer unit superimposes the monochrome images onto the intermediate transfer body 308 in the respective stations, and then transports a multi-color toner image resulting from the superimposition to a secondary transfer roller 309 by the rotation of the intermediate transfer body 308. Meanwhile, the transfer unit transports, while nipping, the recording medium 300 from a paper feed tray 301a or 301b to the secondary transfer roller 309, where the multi-color toner image on the intermediate transfer body 308 is transferred onto the recording medium 300. The toner image is transferred electrostatically by application of an appropriate bias voltage to the secondary transfer roller 309 (this is called secondary transfer.). The secondary transfer roller 309 is in contact with the recording medium 300 at a position 309a during the transfer of the multi-color toner image onto the recording medium 300, and is away from the recording medium 300 at a position 309b after the transfer process.

A fixation unit includes a fixation roller 312 and a pressing roller 313, for fusing the multi-color toner image transferred onto the recording medium 300 to the recording medium 300. Specifically, the fixation roller 312 heats the recording medium 300, and the pressing roller 313 presses the recording medium 300 against the fixation roller 312. The fixation roller 312 and the pressing roller 313 are formed hollow and have heaters 314 and 315, respectively, thereinside. A fixation device 311 fixates the toner to the recording medium 300 by transporting the recording medium 300 carrying the multi-color toner image by the fixation roller 312 and the pressing roller 313 which apply heat and pressure, respectively.

The recording medium 300 after the toner fixation is thereafter ejected to a paper ejection tray (not shown) by ejection rollers (not shown). With this, the image formation operation ends.

A cleaning unit 310 cleans off the toner remaining on the intermediate transfer body 308. Waste toner remaining after the multi(four)-color toner image formed on the intermediate transfer body 308 is transferred onto the recording medium 300 is stored in a cleaner case.

A color deviation detection sensor 320 is located at a position facing the intermediate transfer body 308, and can determine the amount of a deviation of each color based on a patch detection timing of a color deviation detection patch formed on the intermediate transfer body 308.

Figure 4:
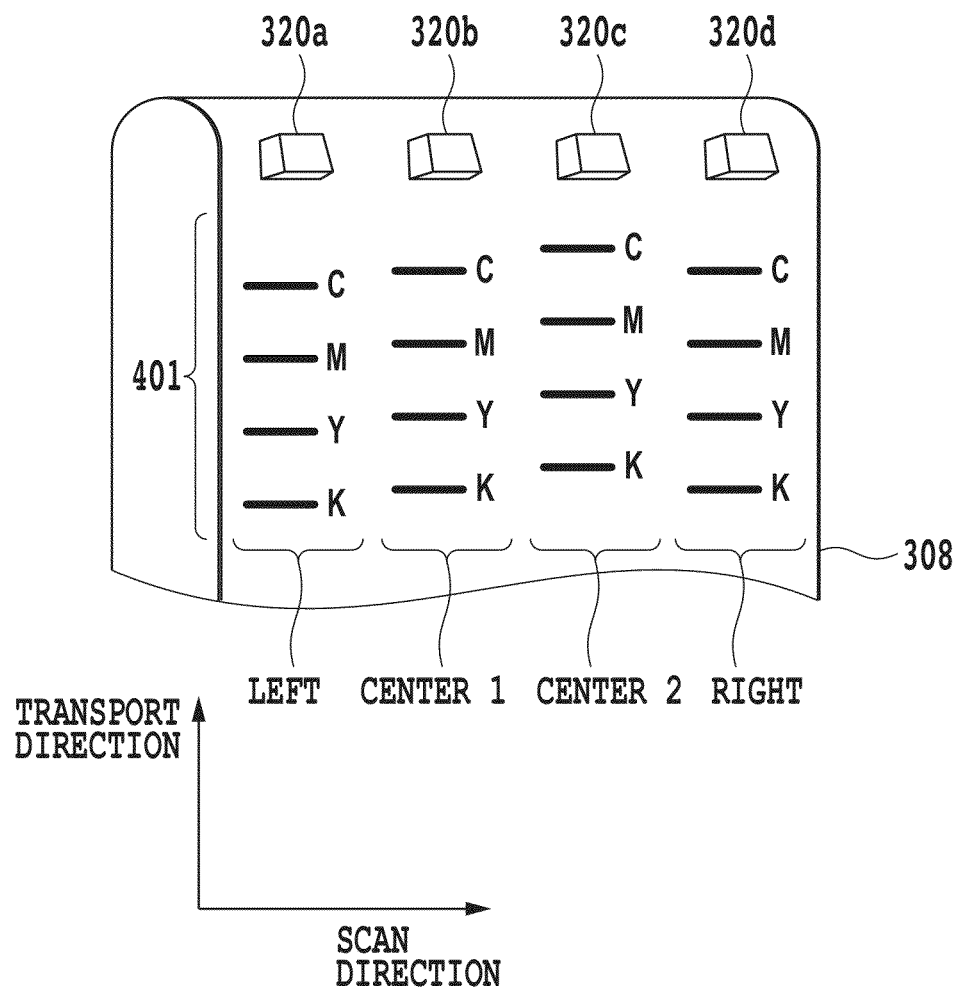
FIG. 4 is a diagram showing an example of color deviation detection.

FIG. 4 is a diagram showing an example of color deviation detection. Four color deviation detection sensors 320a, 320b, 320c, and 320d are arranged in a scan direction (main scanning direction), upstream of the intermediate transfer body 308. Along with the movement of the intermediate transfer body 308 in a transport direction, CMYK color deviation detection patches 401 formed on the intermediate transfer body 308 pass under the respective sensors. Each of the detection sensors 320 is configured to be able to detect its corresponding detection patch 401 passing thereunder.

As FIG. 4 shows, since the detection sensors 320 detect color deviations at four positions—left, center 1, center 2, and right—in the scan direction, inclination and curvature magnitudes of a scan line can be obtained under the control of a CPU (not shown). Some color image formation apparatuses include the color deviation detection sensors 320 at only two positions, left and right. In this case, only the inclination magnitude can be obtained.

Figure 5:
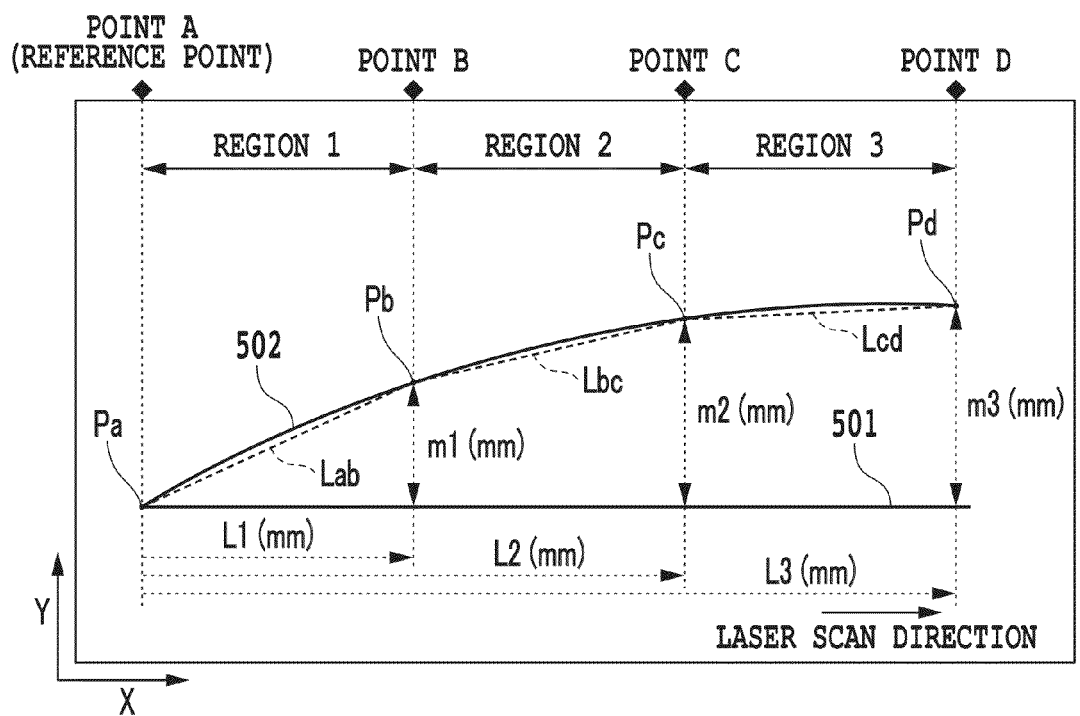
FIG. 5 is a diagram illustrating a color deviation in a main scanning line.

FIG. 5 is a diagram illustrating a color deviation in a main scanning line. Reference numeral 501 in FIG. 5 indicates an ideal scan line. The scan is performed perpendicular to the rotation direction of the photoconductors 302. Reference numeral 502 in FIG. 5 indicates an actual scan line having an inclination and a curvature attributable to the positional accuracy of the photoconductors 302, diameter differences among the photoconductors 302, and the positional accuracy of an optical system in the scanner parts 304 for respective colors.

The magnitudes of such inclination and curvature of the scan line are different for each of C, M, Y, and K image stations. Accordingly, there is a color deviation in an image resulting from transferring toner images of all colors onto the intermediate transfer body 308. The main scanning direction (an X direction) corresponds to a laser scan direction, and a sub scanning direction (a Y direction) corresponds to the transport direction of the recording medium.

Here, point A at which the scan of an image formation region starts is set to a reference point (Pa). Deviation amounts (m1, m2, and m3) in the sub scanning direction (the Y direction) between the ideal scan line 501 and the actual scan line 502 are measured at multiple points (B, C, and D) defined by dividing the scan line in the main scanning direction, and points on the scan line 502 that correspond to the points B, C, and D are set to Pb, Pc, and Pd, respectively.

The main scanning direction (the X direction) is divided into region 1 (between the points Pa and Pb), region 2 (between the points Pb and Pc), and region 3 (between the points Pc and Pd), and straight lines connecting adjacent ones of the points are set to Lab, Lbc, and Lcd. An increment of the deviation amount in the sub scanning direction (the Y direction) in region 1 is m1; that in region 2 is m2-m1; and that in region 3 is m3-m2. Then, when lengths of the respective regions are L1, L2, and L3, inclinations of the respective straight lines Lab, Lbc, and Lcd can be obtained from the increments and the lengths of the respective regions.

When the increment of the deviation amount is a positive value, the scan line corresponding to that region shows a right upward inclination (+), and when the increment of the deviation amount is a negative value, the scan line corresponding to that region shows a right downward inclination (−).

Next, a description is given of processing by the image processing unit 201 in the color image formation apparatus in FIG. 2.

In FIG. 2, from print data received from a computer device or the like (not shown), an image generation part 203 generates bitmap image data on which print processing can be performed. Here, the print data is written generally in a printer description language (PDL), for generating page image data, and normally includes a draw command for data such as texts, graphics, or images. Such print data is analyzed and subjected to rendering processing to generate the bitmap image data.

In the present embodiment, the image generation part 203 analyzes the draw command. Then, based on position information on each of draw objects, a color deviation correction amount computing part 207 computes a color deviation correction amount. Based on the color deviation correction amount thus computed, a color deviation due to the inclination and curvature of a scan line is corrected.

Here, if the print data received is RGB color space image data and if an input handled by the image forming unit 202 is image data corresponding to four color materials of CMYK, the image generation part 203 also performs color conversion processing at the same time. Specifically, the color conversion processing performed here involves conversion of the RGB color space image data into CMYK color space image data by reference to a lookup table or the like. The image generation part 203 performs color deviation correction on the image data of each color of CMYK obtained by the color conversion processing.

Further, when the image generation part 203 generates the bitmap image data, attribute information is generated at the same time. The attribute information shows to what image characteristics each pixel belongs, and is used to specify the type of data according to the image characteristics of each pixel.

Examples of the attribute information include: a text attribute for text data or for data having the image characteristics of text data; an image attribute for natural image or for data having the image characteristics of natural image; and a graphic attribute for draw data or for data having the image characteristics of draw data. Assigning the attribute information to each pixel of the bitmap image data allows the image processing to be performed appropriately according to the image characteristics of the attribute of each pixel.

In the present embodiment, color deviation correction is performed on image data of each of CMYK colors. Accordingly, the attribute information is generated for image data of each of CMYK colors. The details of the color deviation correction processing by the image generation part 203 will be described later.

A halftone processing part 204 performs processing of decreasing the number of gradations of the image data inputted. Normally, the image forming unit 202 is often capable of receiving data with only a few gradations, such as 2, 4, or 16 gradations. Accordingly, the halftone processing part 204 performs the processing of decreasing the number of gradations so that the image forming unit 202 which can only handle reproduction of a few gradations can perform stable halftone representation. Specifically, the halftone processing part 204 employs such a configuration as one using screen processing or one using error diffusion processing. In the screen processing, N-number processing is performed by using multiple predetermined dither matrixes and the image data inputted. Here, N indicates the number of gradations which is less than that in the image data inputted. Further, in the error diffusion processing, N-number processing is performed by comparing the input image data with a predetermined threshold, and the difference between the input image data and the predetermined threshold is diffused to neighboring pixels to be subjected to the N-number processing thereafter. Note that the halftone processing part 204 can perform different halftone processing for each attribute based on the attribute information. In this case, for a natural image which belongs to the image attribute, the halftone processing part 204 can apply halftone processing which prioritizes gradations. Further, for a text which belongs to the text attribute and a line which belongs to the graphic attribute, the halftone processing part 204 can apply halftone processing which prioritizes resolutions.

The halftone processing part 204 accumulates the bitmap image data obtained after the halftone processing in a bitmap memory 205. The bitmap memory 205 temporarily stores the bitmap image data to be subjected to the print processing, and can be configured with a page memory for storing image data for one page or a band memory for storing data for multiple lines.

A pulse width modulation (PWM) unit 206 converts the bitmap image data accumulated in the bitmap memory 205 into one with an exposure time that can be inputted to the scanner part 304 in the image forming unit 202.

Figure 7:
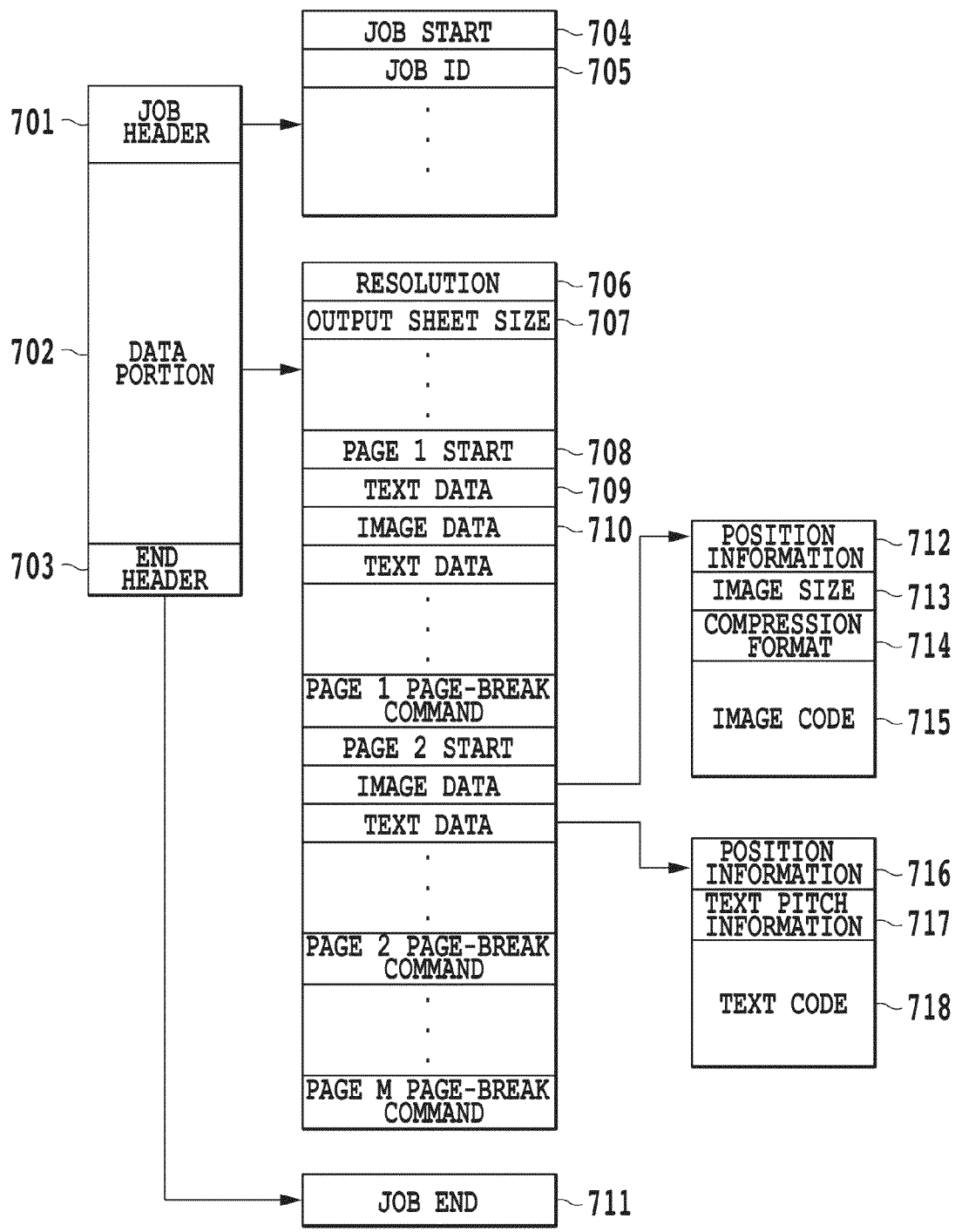
FIG. 7 is a diagram showing a data configuration example of print data.

FIG. 7 is a diagram showing a data configuration example of print data sent to the printer.

The print data shown in FIG. 7 is output data having M output pages, and includes a job header 701, a data portion 702, and an end header 703. The job header 701 includes job start information 704 and other information such as a job ID 705. The data portion 702 includes information for output, such as a resolution 706 and an output sheet size 707, and for each page, a start command 708 and draw objects such as text data 709 and image data 710. Further, the end header 703 includes job end information 711 for this job. The image generation part 203 performs analysis processing on these information pieces of the print data, and thus converts the input print data into the bitmap image data.

As shown in FIG. 7, the image data consists of position information 712, an image size 713, a compression format 714, and an image code 715, and the text data consists of position information 716, text pitch information 717, and a text code 718. Accordingly, by analyzing the print data, position information on where in the bitmap image data each of the draw objects should be drawn can be obtained.

Next, a method for color deviation correction according to the present embodiment is described in detail.

In FIG. 2, a color deviation amount storage part indicated by reference numeral 208 is installed in the image forming unit 202 to store color deviation profile information on each color, namely, 209C, 209M, 209Y, and 209K each including information on the above-described regions (region 1, region 2, and region 3 in FIG. 5).

The color deviation profile information indicates shift amounts in the sub scanning direction between the actual main scanning line 502 and the ideal main scanning line 501 measured at the multiple points (B, C, and D). FIG. 6 is a diagram showing an example of the profile information stored in the color deviation amount storage part 208. Note that the format of the profile information is not limited to the one shown in FIG. 6, and may be any format as long as it shows the characteristics of the inclination and curvature of the scan line.

There are several possible methods for obtaining the color deviation profile information 209 stored in the color deviation amount storage part 208. For example, inclinations can be obtained based on the results of detection, by the color deviation detection sensors 320a, 320b, 320c, and 320d described earlier, of the color deviation detection patches 401 formed on the intermediate transfer body 308. In another method, the deviation amounts can be measured and obtained during the manufacturing process of the image formation apparatus. Alternatively, the profile information can be obtained by a method in which: a color deviation measurement chart prepared in advance is outputted by the image formation apparatus; the image thus outputted is converted into electronic information by using an image scanner or the like; and profile information is obtained based on the electronic information.

The color deviation correction amount computing part 207 in FIG. 2 calculates a correction amount for cancelling out a color deviation for each of objects to be drawn, based on the color deviation profile information 209 stored in the color deviation amount storage part 208 and on engine profile information 210, and then outputs the correction amount to the image generation part 203.

Here, the engine profile information 210 includes information on an offset amount from a reference point corresponding to the sheet size, information on the scan direction of a beam of each color, and information on the transport speed of the recording medium. For example, if the scan direction is different, a reference sign needs to be assigned to the correction amount according to the scan direction. Also, even if the transport speed of the recording medium (a print speed) is different, the color deviation correction amount computing part 207 can control the correction amount according to the print speed, based on the engine profile information 210. For example, when the image formation speed is ½ of a usual speed, the correction amount can be reduced to ½ of that when the image formation speed is 1X by performing the image output in only one of two scan operations without changing the scan speed.

Specifics of the computations performed by the color deviation correction amount computing part 207 are shown below.

Here, the information on each draw object's position in the main scanning direction is acquirable as the position information 712 of image data or the position information 716 of text data by the print data analysis in the image generation part 203.

If the information on the draw object's position in the main scanning direction is represented as x (dot) and the shift correction amount thereof in the sub scanning direction is represented as Δy (dot), correction amounts Δy in the regions 1 to 3 from the reference point in FIG. 5 can be obtained by the following computing equations, respectively. Here, the resolution 706 of the image formation is r(dpi*(mm)/(inch)) and "*" in the equations indicates multiplication.

Region 1:Δy1=x*(m1/L1)     Equation (1)

Region 2:Δy2=m1/r+(x−(L1/r))*((m2−m1)/(L2−L1))     Equation (2)

Region 3:Δy3=m2/r+(x−(L2/r))*((m3−m2)/(L3−L2))     Equation (3)

L1, L2, and L3 indicate the lengths (unit: mm) of the regions 1, 2, and 3, respectively. m1, m2, and m3 indicate shift amounts between the ideal scan line 501 and the actual scan line 502 in the regions 1, 2, and 3 at the rightmost points (Pb, Pc, and Pd), respectively.

The image generation part 203 corrects the position information on each draw object based on the correction amount of the object calculated by the color deviation correction amount computing part 207.

Figure 8:
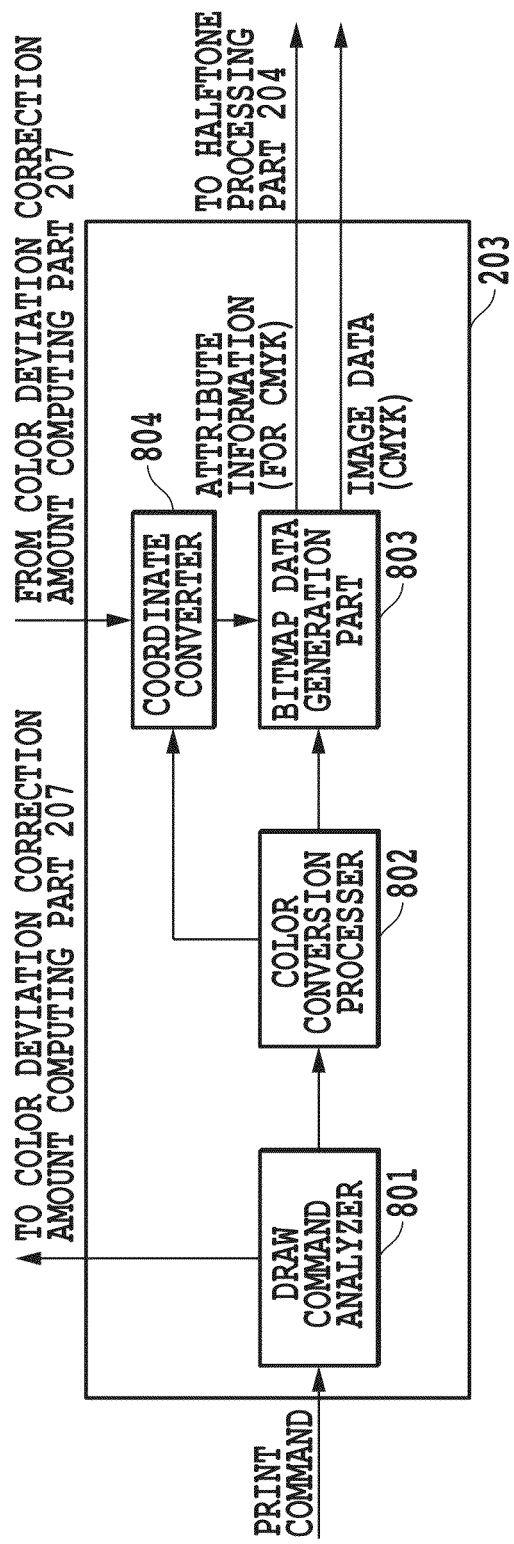
FIG. 8 is a block diagram showing the configuration of an image generation part according to the first embodiment.

FIG. 8 is a block diagram showing the configuration of the image generation part 203 according to the present embodiment.

Reference numeral 801 in FIG. 8 indicates a draw command analyzer configured to analyze print data as the one shown in FIG. 7, analyze the position information on all the draw objects in the print data, and thus obtain their pre-correction position information (coordinate data). The draw command analyzer 801 sends the color deviation correction amount computing part 207 the coordinate data representing the start position in the main scanning direction to draw each object.

A coordinate converter 804 corrects the position information on each draw object based on the position information in the main scanning direction and the sub scanning direction and on the correction amounts Δy obtained from the color deviation correction amount computing part 207. Specifically, the coordinate converter 804 modifies the start position of the draw object by performing correction processing for integer parts of the correction amounts Δy of each of CMYK, namely, on one-pixel-basis.

Based on the position information thus corrected by the coordinate converter 804, a bitmap data generation part 803 performs rendering processing (rasterizing processing) on each draw object having been color-converted by a color conversion processor 802. In this event, the bitmap data generation part 803 generates not only image data corresponding to CMYK, but also attribute information corresponding to each plane. The image data and attribute information thus generated are inputted to the halftone processing part 204.

Figure 9:
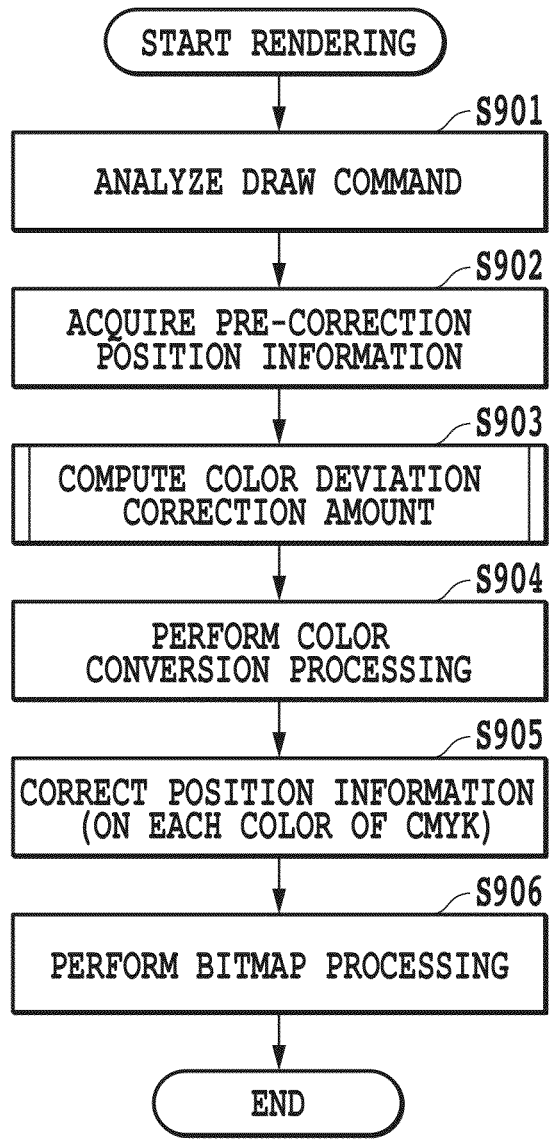
FIG. 9 is a diagram showing a flow of rendering processing of the first embodiment.

FIG. 9 is a diagram showing a flow of the rendering processing in the image generation part 203.

The draw command analyzer 801 analyzes print data (S901), and thus obtains position information on each draw object included in a draw command (S902). Next, the color deviation correction amount computing part 207 computes a color deviation correction amount based on the position information (S903). This computation is conducted using Equations (1) to (3). The color conversion processing unit 802 color-converts the draw object into CMYK color space data (S904), and then for each draw object, corrects the position information on the image data corresponding to CMYK, based on the color deviation correction amount obtained by the coordinate converter 804 (S905: draw position correction processing). The bitmap data generation part 803 performs bitmap processing on the draw object based on the position information thus corrected (S906).

Figure 10:
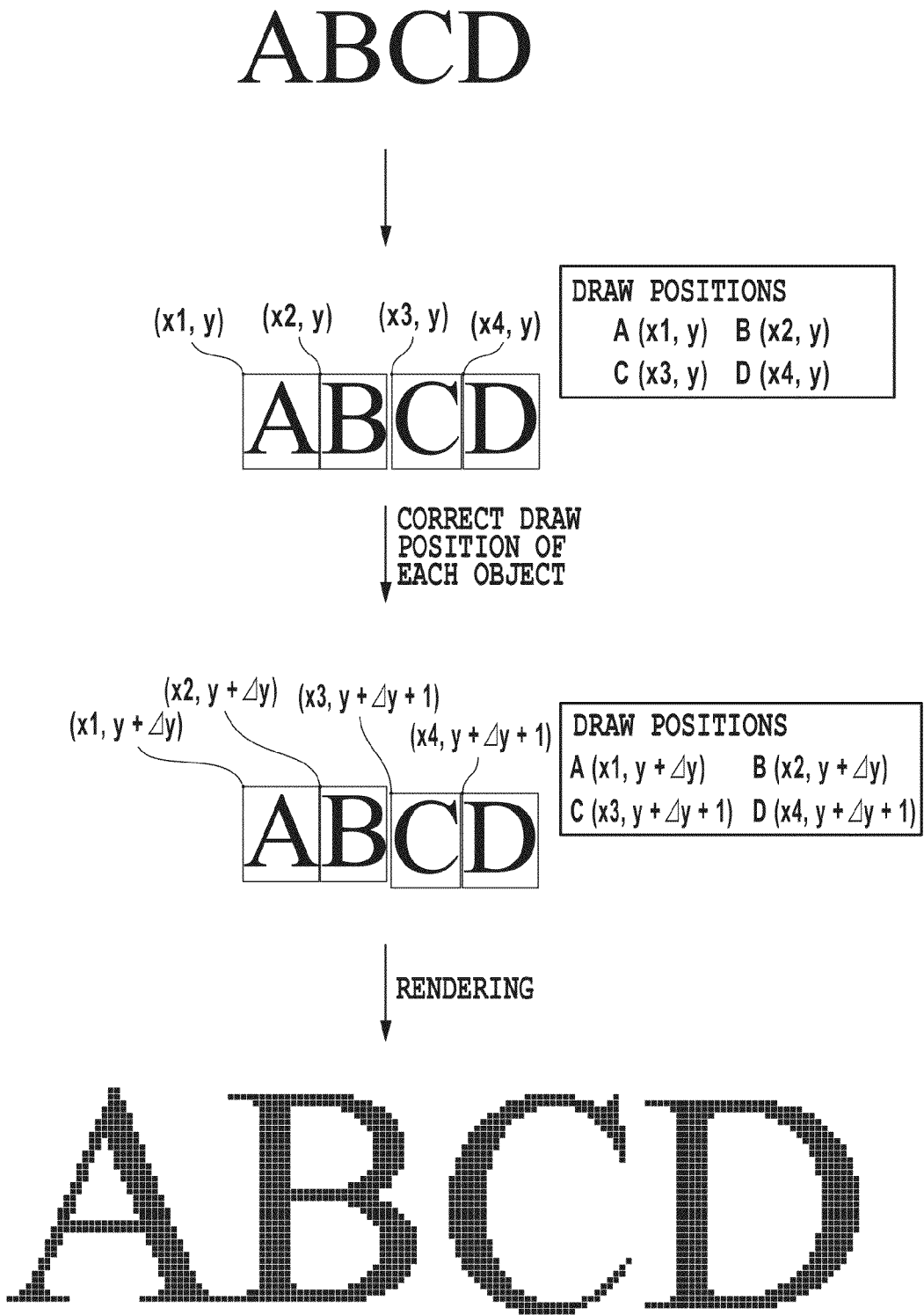
FIG. 10 is a diagram showing an example of object-basis color deviation correction in the embodiment of the present invention.
Figure 15:
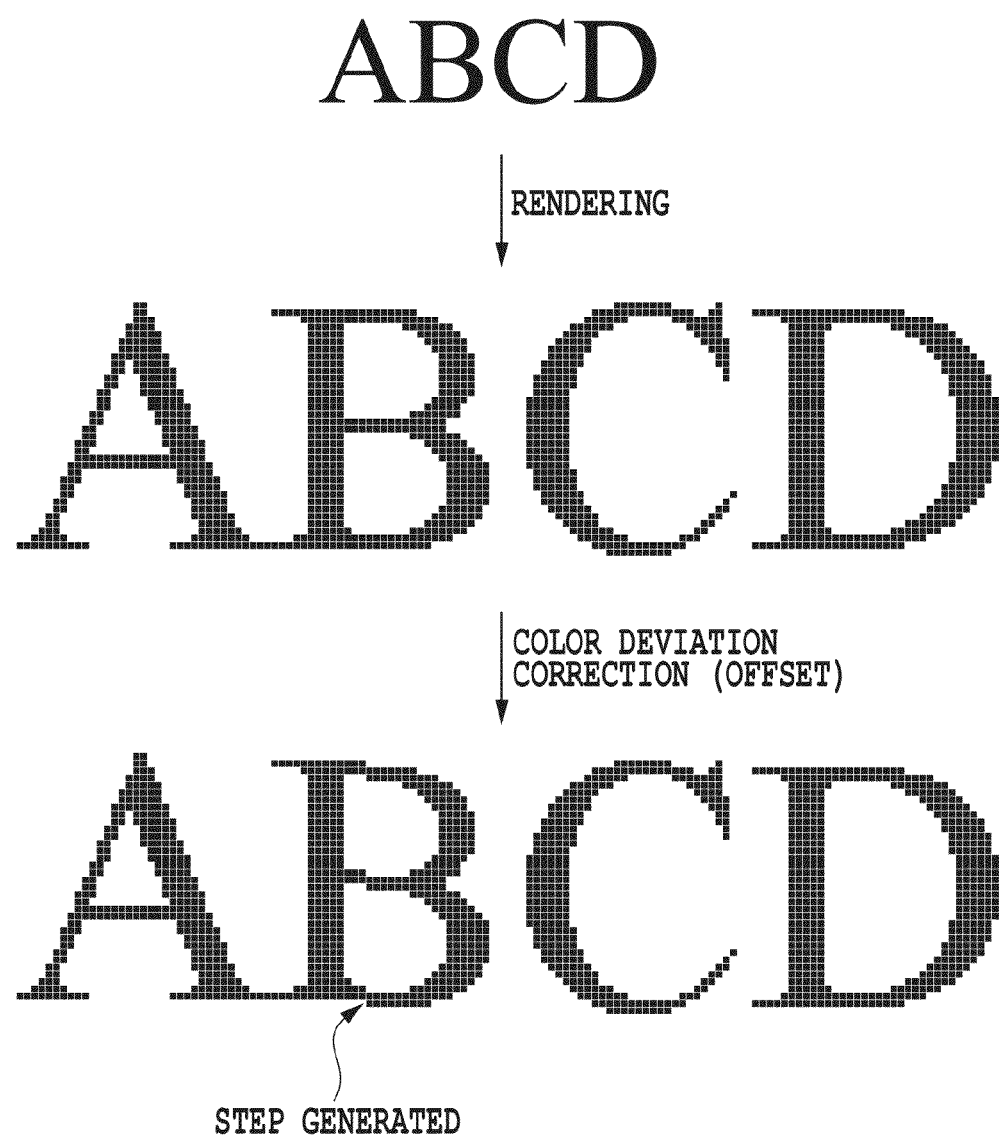
FIG. 15 is a diagram showing an example of conventional one-pixel-basis color deviation correction.

Examples of effects of the embodiment of the present invention are described now using FIGS. 10 and 15. Drawing a text string "ABCD" is taken as an example here.

If a draw object is a text with a small point size, it is preferable not to perform correction on a less-than-one-pixel-basis in order to avoid unevenness in density. However, if the correction is performed not on a less-than-one-pixel-basis, but on one-pixel-basis as conventionally conducted, an awkward step might possibly be generated between the text and its neighborhood.

FIG. 15 shows an example where the color deviation correction is performed on one-pixel-basis like a conventional method.

In the conventional method, a color deviation correction amount is computed for each pixel in bitmap image data having subjected to rendering. For this reason, depending on print data, a text with a small point size is drawn at the offset position, generating a step.

FIG. 10 shows an example of correction in the embodiment of the present invention. In the embodiment of the present invention, the draw position of the draw object in the print data is offset. In this example, "AB" is corrected by offsetting the draw positions of "CD" from the draw positions of "AB". Accordingly, an awkward step is not generated without performing less-than-one-pixel-basis correction. Although FIG. 10 shows an example where only a single color is used, similar processing can be applied for each color of CMYK.

As described, according to the present embodiment, in the electrical color deviation correction, a draw command is analyzed to specify a draw position for color deviation correction for each of draw objects. By performing an offset for color deviation correction on a draw object basis, electrical color deviation correction can be performed without generation of a step and thus without unevenness in density.

In the example described in the embodiment given above, the image formation apparatus receives and analyzes PDL data and thus extracts the position information on an object and the like. Alternatively, the image formation apparatus may obtain image data by reading an original with a scanner, and analyze information obtained by analyzing the image data similarly to the case of the draw command described above so as to extract an object, the position information on the object, and the like.

Embodiment 2

In the first embodiment of the present invention described above, generation of a step in image data to be drawn is avoided by performing color deviation correction on a draw object basis and performing an offset on a draw object basis. However, when the color deviation correction is performed on a draw object basis, a color deviation may possibly occur within the same object, depending on how much the scan line inclines or curves. Particularly, when the draw object is large in the main scanning direction, such a phenomenon is very likely to occur.

A second embodiment of the present invention takes this problem into consideration, and determines, based on the width of a draw object, whether one-pixel-basis color deviation correction, namely an offset, occurs within the draw object. Further, when an offset occurs, whether to perform an offset within the draw object is determined based on the characteristics of the draw object and the difference in the correction amount within the draw object.

Figure 11:
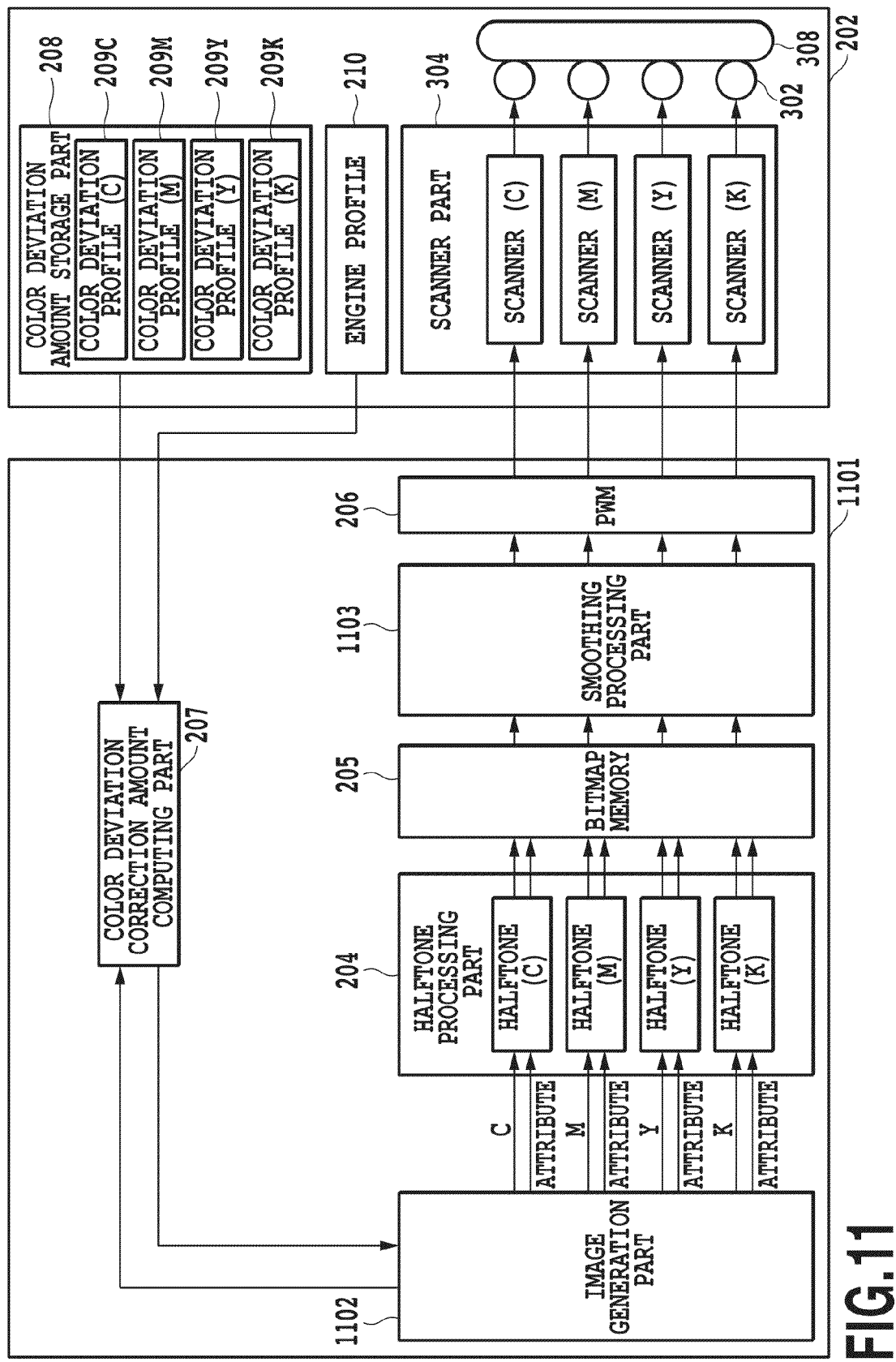
FIG. 11 is a block diagram illustrating an image formation apparatus according to a second embodiment.

FIG. 11 is a block diagram illustrating an image formation apparatus according to the second embodiment of the present invention.

In FIG. 11, processing units of an image processing unit 1101 are the same as those of the image processing unit 201 of the first embodiment, except for an image generation part 1102 and a smoothing processing part 1103, and are therefore not described in detail here.

Processing by the image generation part 1102 of the second embodiment of the present invention is described.

As in the first embodiment of the present invention, the image generation part 1102 generates bitmap image data on which print processing can be performed, by analyzing, and performing rendering processing on, print data received from a computer device or the like (not shown). Here, the print data has the same configuration as the example shown in FIG. 7. In the second embodiment of the present invention, the image generation part 1102 corrects a color deviation due to scan line inclination and curvature within a draw object, based not only on the position information on the draw object, but also on the draw width of the draw object.

The information on each draw object's position in the main scanning direction is acquirable as the position information 712 of image data or the position information 716 of text data by analyzing print data in the image generation part 1102. In addition, the draw width of the draw object is acquirable from the image size 713 or the text pitch information 717.

Figure 12:
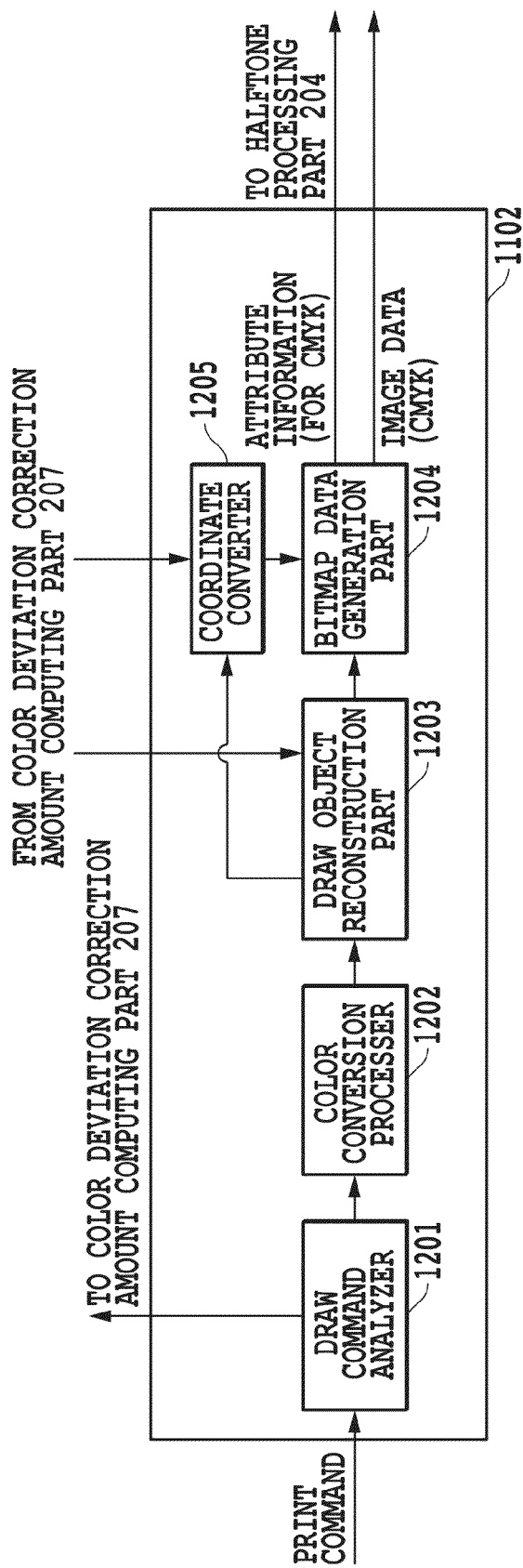
FIG. 12 is a block diagram showing the configuration of an image generation part according to the second embodiment.

FIG. 12 is a block diagram showing the configuration of the image generation part 203 according to the present embodiment.

Reference numeral 1201 in FIG. 12 indicates a draw command analyzer configured to analyze print data as the one shown in FIG. 7, analyze all the draw objects in the print data, and thus obtain their pre-correction position information and draw widths. The draw command analyzer 1201 sends the color deviation correction amount computing part 207 both draw start position information and draw end position information on each draw object. Here, the draw start position information is equivalent of the position information on the draw object, and the draw end position information is what the draw width is added to the draw start position information. Note that the color deviation correction amount of the draw object can also be computed using not the draw start position information, but the draw end position information.

For each of the draw start position information and the draw end position information, the color deviation correction amount computing part 207 calculates a correction amount for each of CMYK colors. Note that the cause of a color deviation includes not only an inclination of a scan line but also a curvature of a scan line. In other words, even when the draw start position and the draw end position have the same absolute value of a correction amount, a scan line might be curved within an object. Accordingly, the correction amount of the draw end position is desirably represented in a relative amount to the draw start position, the relative amount being defined by an upward correction amount and a downward correction amount.

A draw object reconstruction part 1203 determines, based on a calculation result of the correction amount for the draw end position, whether a color deviation of more than one pixel occurs within the draw object or not. When it is determined that a color deviation of more than one pixel occurs within the draw object, the draw object reconstruction part 1203 further determines, based on the characteristics of the draw object and the difference in the correction amount within the draw object, whether to perform an offset within the draw object.

First, if there is no difference in the correction amount within the object, the coordinate converter 1205 corrects the position information on an object basis, as shown in the first embodiment. If there is a difference in the correction amount, but the correction amount is smaller than a threshold th, the coordinate converter 1205 corrects the position information on an object basis, as shown in the first embodiment, because there is almost no influence on the color deviation. On the other hand, if the difference in the correction amount within the object is equal to or larger than the threshold th, one-pixel-basis correction involving an offset within the object is needed. Note that the threshold th is determined according to the engine characteristics such as resolutions.

Here, when the draw object is image data, a negative effect produced by performing an offset, namely a step, is not really noticeable. Accordingly, in a case of image data, in addition to the object-basis correction of the position information, one-pixel-basis correction involving an offset within the object is performed.

On the other hand, when the draw object is text data or graphics data, a step generated due to the offset is often noticeable. Accordingly, in addition to the object-basis correction of the position information and the one-pixel-basis correction involving an offset within the object, less-than-one-pixel-basis correction processing needs to be performed depending on the characteristics of the image. When it is determined that the less-than-one-pixel-basis correction processing, namely smoothing processing, is needed, an attribute signal is generated so that the smoothing processing part 1103 can perform the smoothing processing. The attribute signal indicates which pixel in the object to perform the smoothing processing. Since the smoothing processing involves neighboring pixels such as preceding and succeeding pixels, the attribute signal is used to show the smoothing processing part 1103 a target pixel for the smoothing processing.

The draw object reconstruction part 1203 reconstructs the draw object and thereby achieves the offset processing within the draw object. In other words, a new object in which the influence of the offset is considered is generated. Note that the position for the offset within the draw object can be calculated with the draw start position used as a reference, by a method similar to a conventional one. The draw object can be reconstructed by changing the shape of the draw object according to the position of the offset.

A color conversion processing unit 1202 performs color conversion processing on each draw object, and a bitmap data generation part 1204 performs rendering processing on the draw object, based on the reconstructed draw object whose position information has been corrected. In this event, image data corresponding to CMYK and attribute information corresponding to each plane are generated. For pixels determined as needing the smoothing processing, attribute information (attribute signals) for the smoothing processing are generated, as well. The image data and attribute information thus generated are inputted to the halftone processing part 204.

As in the first embodiment, the halftone processing part 204 performs processing of reducing the number of gradations of the image data inputted, and accumulates bitmap image data after the halftone processing in the bitmap memory 205. The smoothing processing part 1103 performs the less-than-one-pixel-basis color deviation correction processing, namely smoothing processing, on the bitmap image data accumulated in the bitmap memory 205, based on the attribute signals generated by the image generation part 1102. Note that, as the method for the smoothing processing, gradation conversion of neighboring pixels of the offset position may be performed as conventionally conducted.

The pulse width modulation (PWM) unit 206 converts the bitmap image data processed by the smoothing processing part 1103 into one with an exposure time that can be inputted to the scanner part 304 in the image forming unit 202.

Figure 13:
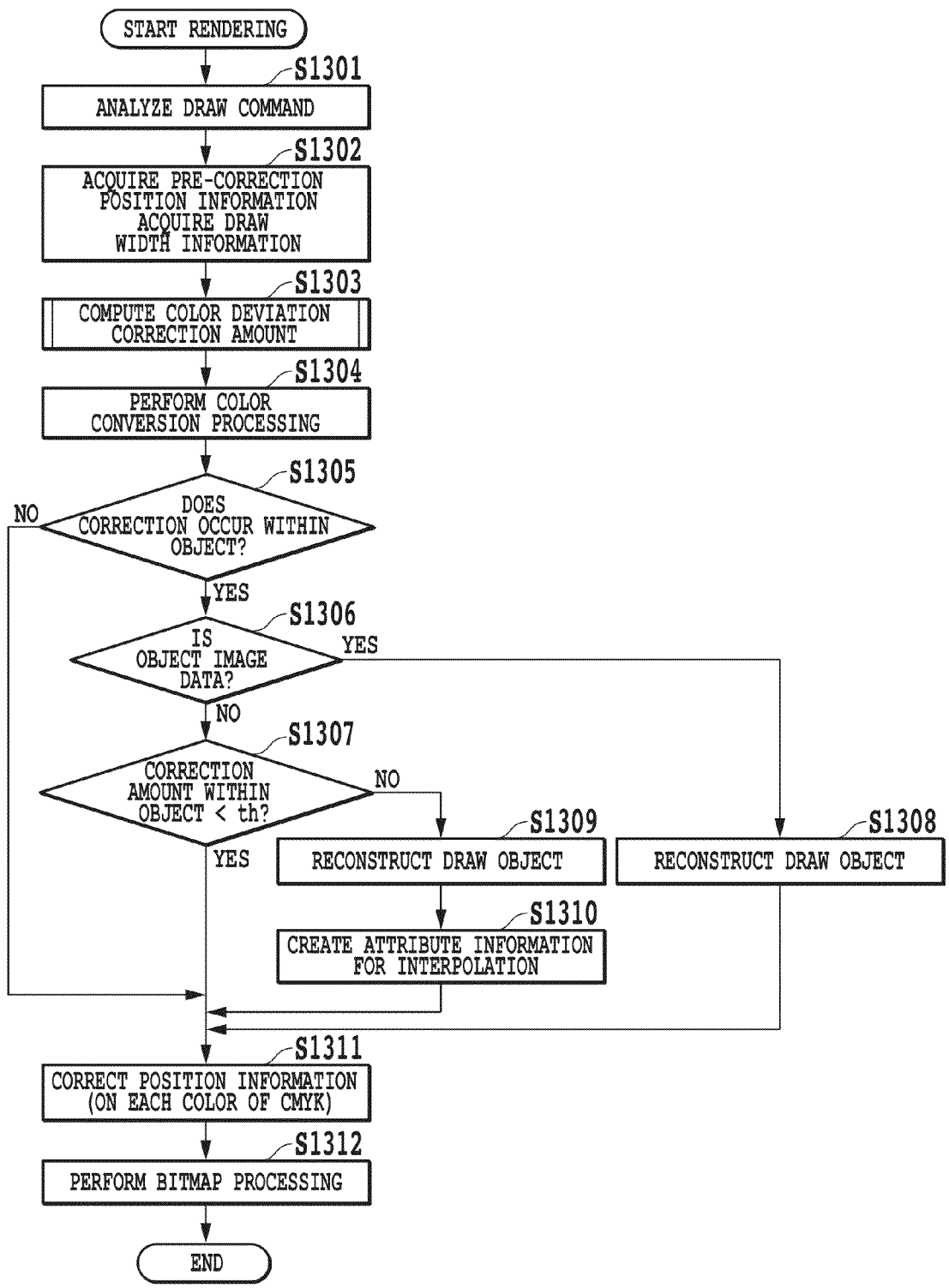
FIG. 13 is a diagram showing a flow of rendering processing of the second embodiment.

FIG. 13 is a diagram showing a flow of the rendering processing performed in the image generation part 1102.

The draw command analyzer 1201 analyzes print data (S1301), and obtains position information and draw width information on each of draw objects included in a draw command (S1302). Next, the color deviation correction amount computing part 207 computes a color deviation correction amount for each object based on its position information and the draw width information (S1303). This computation is carried out using Equations (1) to (3). The color conversion processing unit 1202 color-converts the draw object into CMYK color space draw object (S1304), and then the draw object reconstruction part 1203 determines the need for correction within the draw object based on the correction amount obtained by the color deviation correction amount computing part 207 (S1305). Here, when one-pixel-basis correction does not occur within the object (S1305 No), the coordinate converter 1205 performs object-basis correction of the position information (S1311). On the other hand, when one-pixel-basis correction occurs within the object (S1305 Yes), it is determined whether the draw object is image data or not (S1306). When the draw object is image data (S1306 Yes), the draw object reconstruction part 1203 reconstructs the draw object so as to perform an offset (perform one-pixel-basis correction) within the draw object of the image data (S1308). When the draw object is not image data (S1306 No), it is determined whether the correction amount within the object is smaller than a threshold or not (S1307). When the correction amount within the object is smaller than the threshold (S1307 Yes), an offset within the draw object is not performed, and object-basis correction of the position information is performed by the coordinate converter 1205 (S1311). Further, when the correction amount within the object is equal to or larger than the threshold, (S1307 No), the draw object reconstruction part 1203 reconstructs the draw object so as to perform an offset within the draw object (S1309). In addition, attribute information for interpolation (smoothing) is generated (S1310).

In S1312, the bitmap data generation part 1204 performs bitmap processing on the draw object whose position information has been corrected.

In the above flow, as the first determination criterion, whether to perform an offset within the draw object is determined according to the attribute of the object, namely, according to whether the draw object is image data or not. Note, however, that other determination criteria may be used. For example, an offset on a draw object basis offers a high effect when the background is white. Accordingly, an offset on a draw object basis may be performed when the background is white.

Figure 14:
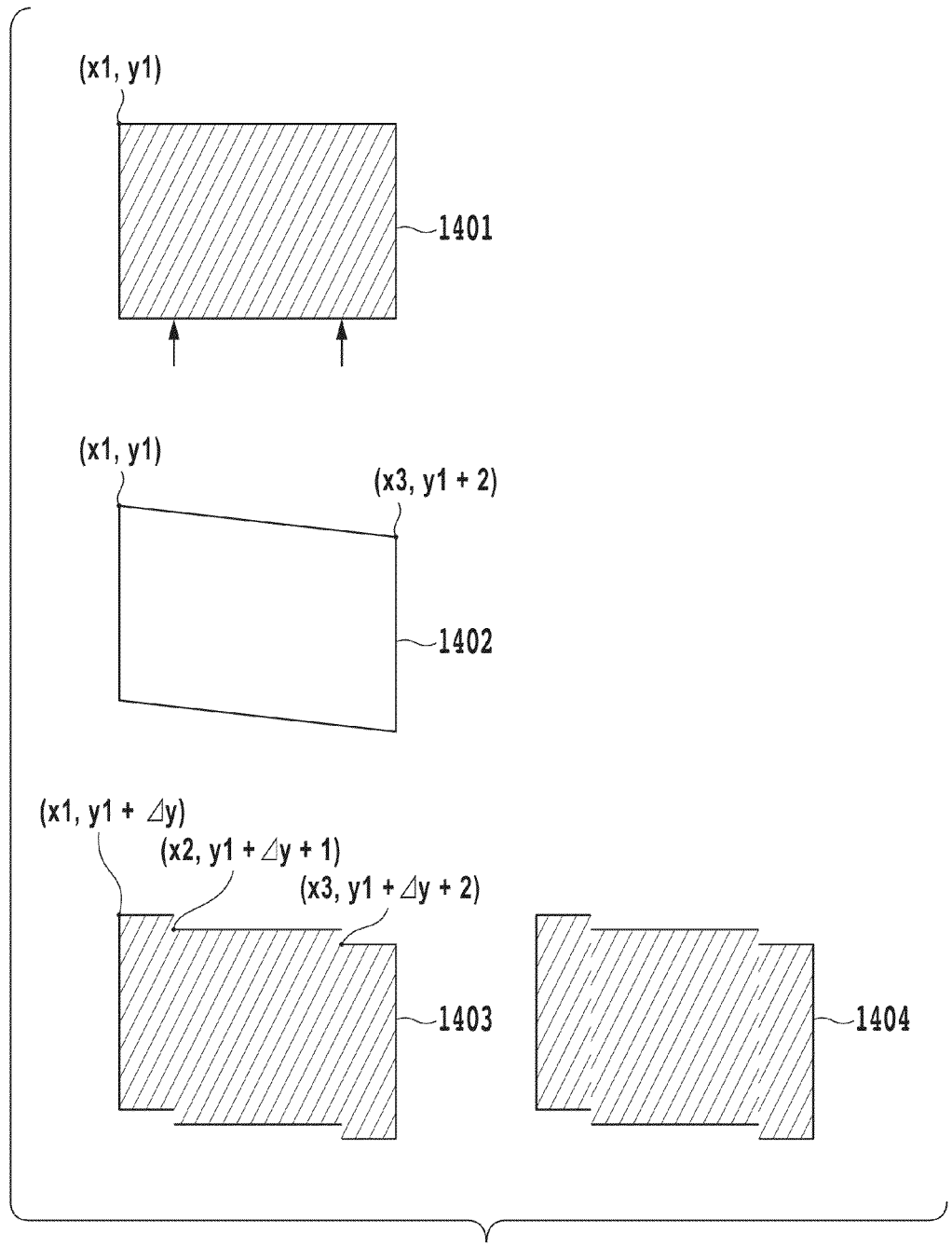
FIG. 14 is a diagram showing an example of draw object reconstruction processing.

FIG. 14 shows an example of draw object reconstruction processing performed in the second embodiment of the present invention.

Reference numeral 1401 indicates a draw object of graphics data. The inside of a rectangle is shaded with a diagonal line pattern, and the draw start position is (x1, y1). Further, this draw object needs one-pixel-basis color deviation correction at two positions indicated by the arrows. Reference numeral 1402 is a reconstructed draw object. To perform an offset for color deviation correction, the draw object having a rectangular shape is reconstructed to have a parallelogram shape. Reference numeral 1403 indicates a result of performing rendering processing on the draw object whose position information has been corrected. When necessary, attribute information for the smoothing processing may be added for an offset edge portion.

Reference numeral 1909 shows a result of performing an offset for color deviation correction on the draw object 1401 which has been subjected directly to the rendering processing without being reconstructed as shown in the draw object 1402. The inside pattern are deviated due to an influence by the offset within the draw object. In the present embodiment, the draw object needs to be reconstructed to prevent such a negative effect.

As described, according to the second embodiment of the present invention, whether one-pixel-basis color deviation correction is needed within a draw object or not is determined based on the width of the draw object. When one-pixel-basis color deviation correction is needed, it is determined, based on the characteristics of the draw object and the difference in the correction amount within the draw object, whether to perform an offset within the draw object or not. As a result, electrical color deviation correction can be performed while preventing generation of a step as much as possible.

Embodiment 3

In the first and second embodiments of the present invention described above, the image formation apparatus performs processing for color deviation correction. On the other hand, recent systems often perform print processing in the following manner. Specifically, a computer device (an image processing apparatus) or the like communicatively connected to an image formation apparatus performs the rendering processing and the halftone processing, and sends the image formation apparatus the print data obtained by the halftone processing. In a third embodiment of the present invention, a case where color deviation correction processing is performed by image formation processing on a host computer is described.

Such color deviation correction processing can be performed by the image formation processing on the host computer when the host computer performs the same processing as the processing performed by the image processing units 201 and 1101 described in detail in the first and second embodiments, respectively.

By using an application that operates on the host computer, a page layout document, a word processor document, a graphic document, or the like is generated. To print digital document data thus generated by the application, the application gives a printer driver a draw command based on the digital document. The printer driver applies the object-basis color correction processing described in the first and second embodiments to the draw command. Thereby, color deviation correction processing equivalent of that performed by the image formation apparatus can be implemented by the image formation processing on the host computer.

Note here that the image formation apparatus needs to give the color deviation profile information 209 to the host computer connected to the image formation apparatus.

As described, in the third embodiment of the present invention, a printer driver analyzes a draw command given by an application, and for each draw object, specifies a draw position for color deviation correction. By performing an offset for color deviation correction on a draw object basis, electrical color deviation correction without generation of a step and without unevenness in density can be achieved even when print processing is performed by a host computer.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-260318, filed Nov. 13, 2009, which is hereby incorporated by reference herein in its entirety.

What is claimed is:

1. An image processing apparatus comprising:
an analysis unit configured to obtain information on a draw position of an object by analyzing a draw command of the object;
a correction unit configured to correct a draw position of the object in a sub-scanning direction using the information on the draw position and information on deviation in a sub-scanning direction of an image formed by an image forming unit;
a shape changing unit configured to change a shape of the object in a sub-scanning direction using the information on the draw position and the information on the deviation; and
a rasterizing unit configured to, in a case where an attribute of the object is an image, rasterize the object whose shape is changed by the shape changing unit to the draw position corrected by the correction unit and, in a case where an attribute of the object is a text, rasterize the object whose shape is not changed by the shape changing unit to the draw position corrected by the correction unit.

2. The image processing apparatus according to claim 1, wherein the rasterizing unit rasterizes the object whose shape is changed by the shape changing unit to the draw position corrected by the correction unit in a case where an attribute of the object is a graphics.

3. The image processing apparatus according to claim 1, wherein the obtained information on the draw position includes a draw start position of the object and a draw end position of the object, and wherein the shape changing unit changes a shape of the object in a sub-scanning direction using a correction amount, the correction amount being obtained by computing a deviation between the draw start position and the draw end position within the object using the information on the draw position and the information on the deviation.

4. The image processing apparatus according to claim 3, wherein the shape changing unit changes a shape of the object in a sub-scanning direction in a case where the correction amount within the object is equal or more than a threshold and does not change a shape of the object in a sub-scanning direction in a case where the correction amount within the object is less than the threshold.

5. The image processing apparatus according to claim 4, wherein in a case where an attribute of the object is a graphics,
the shape changing unit determines, on the basis of the correction amount within the object, whether a shape of the object is changed, and
the rasterizing unit, in a case where the shape changing unit determines the shape of the object is changed, rasterizes the object whose shape is changed by the shape changing unit to the draw position corrected by the correction unit and, in a case where the shape changing unit determines the shape of the object is not changed, rasterizes the object whose shape is not changed by the shape changing unit to the draw position corrected by the correction unit.

6. The image processing apparatus according to claim 1, further comprising:
a halftone processing unit configured to performing a halftone process on the object rasterized by the rasterizing unit.

7. An image processing method comprising:
obtaining information on a draw position of an object by analyzing a draw command of the object;
correcting a draw position of the object in a sub-scanning direction using the information on the draw position and information on deviation in a sub scanning direction of an image formed by an image forming unit;
in a case where an attribute of the object is an image,
changing a shape of the object in a sub-scanning direction using the information on the draw position and the information on the deviation and rasterizing the object whose shape is changed to the corrected draw position; and
in a case where an attribute of the object is a text,
without changing a shape of the object in a sub-scanning direction, rasterizing the object whose shape is not changed to the corrected draw position.

8. The image processing method according to claim 7, wherein in a case where an attribute of the object is a graphics,
changing a shape of the object in a sub-scanning direction using the information on the draw position and the information on the deviation, and
rasterizing the object whose shape is changed to the corrected draw position.

9. A non-transitory computer readable medium which stores a program causing a computer to execute an image processing method, the method comprising:
obtaining information on a draw position of an object by analyzing a draw command of the object;
correcting a draw position of the object in a sub-scanning direction using the information on the draw position and information on deviation in a sub-scanning direction of an image formed by an image forming unit;

in a case where an attribute of the object is an image,
changing a shape of the object in a sub-scanning direction using the information on the draw position and the information on the deviation and rasterizing the object whose shape is changed to the corrected draw position; and
in a case where an attribute of the object is a text,
without changing a shape of the object in a sub-scanning direction, rasterizing the object whose shape is not changed to the corrected draw position.

* * * * *